No. 799,263. PATENTED SEPT. 12, 1905.
H. C. PRIEBE.
DRAFT GEAR.
APPLICATION FILED MAR. 7, 1905.
2 SHEETS—SHEET 1.
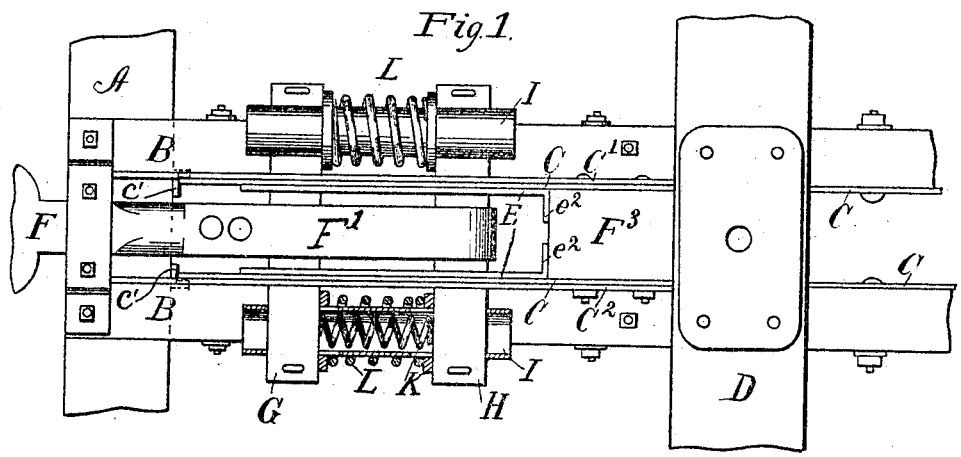
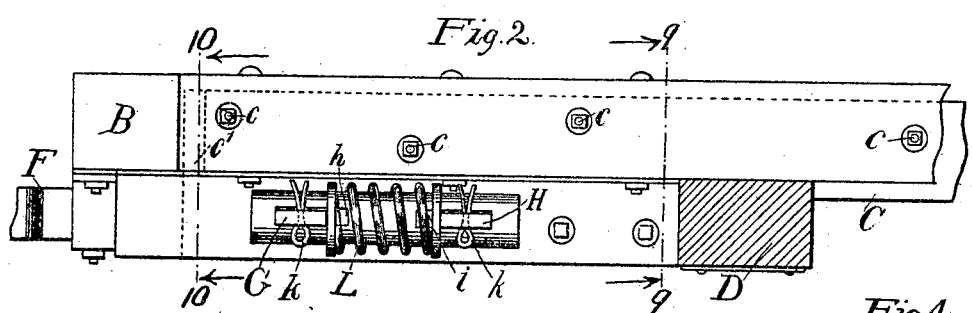
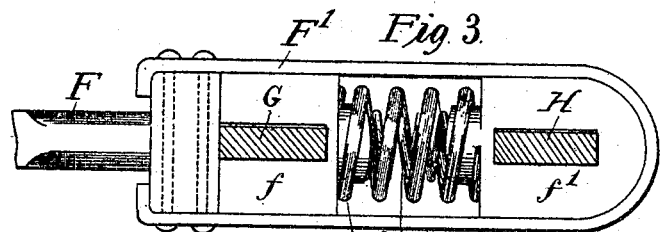
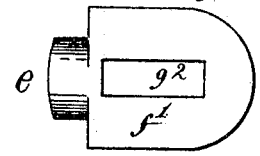
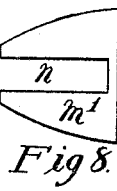
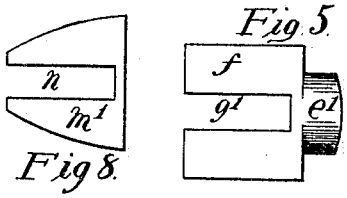
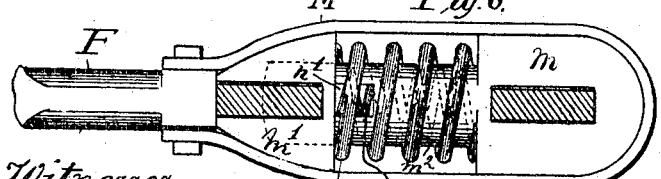
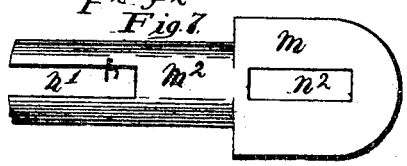
Witnesses:
Chas. F. Bassett
W. B. Spencer
Inventor:
Herman C. Priebe,
By
Atty.

No. 799,263. PATENTED SEPT. 12, 1905.
H. C. PRIEBE.
DRAFT GEAR.
APPLICATION FILED MAR. 7, 1905
2 SHEETS—SHEET 2.
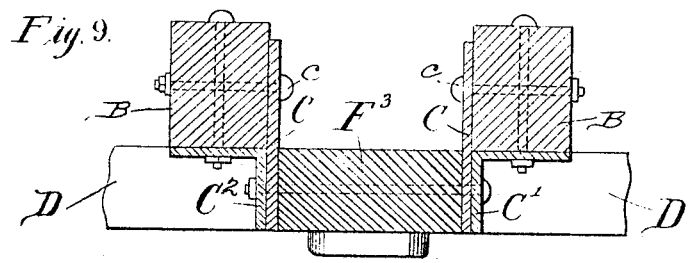
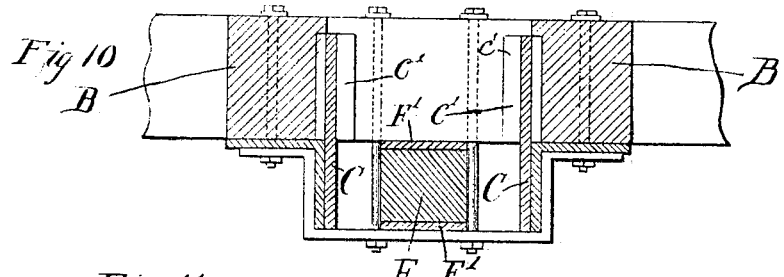
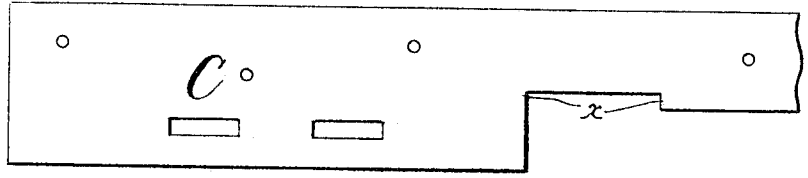
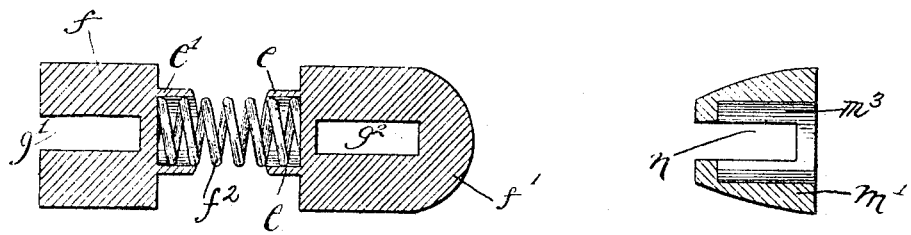 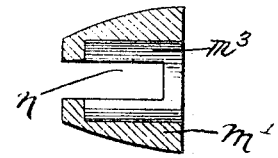
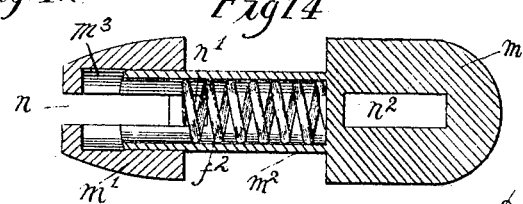
Witnesses:
Chas. F. Bassett
C. S. Corning
Inventor
Herman C. Priebe
By Norman King
Atty.

UNITED STATES PATENT OFFICE.

HERMAN C. PRIEBE, OF BLUE ISLAND, ILLINOIS.

DRAFT-GEAR.

No. 799,263. Specification of Letters Patent. Patented Sept. 12, 1905.

Application filed March 7, 1905. Serial No. 248,877.

*To all whom it may concern:*

Be it known that I, HERMAN C. PRIEBE, a citizen of the United States, residing at Blue Island, in the county of Cook and State of Illinois, have invented certain new and useful Improvements in Draft-Gears, of which the following, taken in connection with the drawings, is a description.

My invention relates to improvements in draft-gears for railway-cars.

My object is to provide such a draft-gear adapted more especially for cars the sills of which are in a plane above that of the draw-bar and of an improved construction rendering it particularly strong, durable, and easy of access for repair when necessary and whereby the travel of the draw-bar against the resistance of its springs may be reduced to the lowest limit consistent with safety.

In the drawings, Figure 1 is a bottom plan view of my gear with a portion of one side in section. Fig. 2 is a side elevation of the same. Fig. 3 is a detail of the draw-bar yoke. Figs. 4 and 5 are details of the castings supporting the compression-springs in the draw-bar yoke. Fig. 6 is a modification of the draw-bar yoke. Figs. 7 and 8 are details of castings used in the yoke shown in Fig. 6. Fig. 9 is a cross-section taken on line 9 9 of Fig. 2 looking in the direction of the arrows. Fig. 10 is a similar view taken on line 10 10 of Fig. 2 looking in the direction of the arrows. Fig. 11 is a side elevation of the body-bolster. Figs. 12, 13, and 14 are details of the castings.

A is the end sill of a car-frame, and B B are the center sills.

C C are the draft-plates, which may be formed of one piece and are secured in any desired manner to the sills B B.

Angle-irons $C'$ $C^2$ are secured to the sills B B and to the draft-plates C. Two draft-plates C C may be provided, one at each end of the car and each of a length to abut against or be secured to the body-bolster D toward that end of the car, or a single draft-plate may be provided to extend the full length of the car. The draft-plates C C are secured to the sills B B by bolts $c$ or otherwise and are notched or recessed, as at $x$, to receive, fit closely around, and bear against the body-bolster D. By this means the strain upon the bolts $c$ is relieved by the contact of the draft-plate with the body-bolster upon either side thereof, said bolster receiving the strain coming from either direction. Angle-plates $c'$, Figs. 1 and 10, are arranged to fit in the angle formed by the end sill and the center sills upon each side of the draw-bar, against which the ends of the draft-plates C C abut. This construction not only provides a particularly strong and durable draft-plate, but serves very materially to strengthen the underframing of the car.

Angle-plates E are secured to the inner sides of the draft-plates C C, which gives additional strength to the underframing of the car. The ends $e^2$ $e^2$ of the angle-plates E are bent at the rear end thereof at right angles. The ends $e^2$ $e^2$ of the angle-plates abut against the bumper-block $F^3$, disposed between them and the body-bolster D.

F is a draw-bar disposed between the draft-plates C C and provided at its stem portion with a yoke $F'$.

Disposed inside of the yoke $F'$ and abutting against the end of the draw-bar F is a casting or washer $f$, and abutting against the circular end of this yoke is a similar casting or washer $f'$. Each of these washers $f$ and $f'$ is provided with a projection $e'$ $e$, respectively, hollow upon the inside and outside and inside of which is disposed the coiled springs $F^2$ and $f^2$. Elongated openings $g'$ $g^2$ are provided in the washers $f$ $f'$, respectively, and coincident with these openings $g'$ $g^2$ are openings through the draft-plates C, angle-irons $C'$ $C^2$, and angle-plates E. Extending loosely through the opening $g'$ and coincident openings through the draft-plates C, angle-irons $C'$ $C^2$, and angle-plates E is a forward bar or follower G, and extending through the opening $g^2$ and coincident openings through the draft-plates, angle-plates, and angle-irons is a rear bar or follower H.

I I are tubes provided with forward and rear openings $h$ $i$, coincident in size and position with the openings $g'$ $g^2$. The tubes fit loosely over the end portions of the bars G H and are held by cotters $k$ or the like. In each tube is a cushioning-spring K, and around each tube is a cushioning-spring L, the springs bearing at opposite ends, respectively, against the bars G H, operating to press the bar G against the forward ends of the slot $g'$ and the bar H against the rear end of the slot $g^2$.

Pressure of the draw-bar in the backward direction causes it to slide the bar G and compress the springs K L against the stationary bar H, while a pull upon the draw-bar causes it to slide the bar H and compress springs K L against the stationary bar G. Thus the same set of springs operates against both the forward and rear movement of the draw-bar and permits the same to have the limited movement desired.

In Fig. 6 I have shown a modified form of yoke M, which is secured to the draw-bar F in the same manner as the yoke previously described. Disposed within this yoke M are the castings $m\ m'$, Figs. 7 and 8, the casting $m$ fitting into the circular end of said yoke and the casting $m'$ abutting against the draw-bar F. The casting $m'$ is practically cone-shaped and is provided with an open-ended slot $n$, through which the follower-bar G is passed. The rear casting $m$ is provided with a tubular projection $m^2$, having an open-ended slot $n'$ in the end thereof. This casting is also provided with the slotted opening $n^2$, through which the follower-bar H is passed.

In assembling the parts the tubular projection $m^2$ is extended into an annular opening $m^3$ in the casting $m'$, Figs. 13 and 14, the slots $n'$ and $n$ being coincident. The cushioning-springs $F^2 f^2$ are arranged upon the outside and inside of the tubular projection $m^2$ and are adapted to resist the strain of the backward movement of the follower-bar G and the forward movement of follower-bar H.

The greatest strain upon the draft-gear in practice takes place usually under the shocks of cars bumping together. The cushioning-springs, which I have shown disposed inside the yoke and outside the draft-plates, compressing against the follower-bars, take up the strain and shock of the cars occasioned by bumping together.

The tubes I I form convenient supports for the springs and maintain them against danger of buckling or interference with each other. All parts of the draft-rigging are readily accessible and may be easily and quickly replaced in case that repairs are necessary.

As shown and described my improved draft-rigging is particularly strong, durable, and well adapted for its purpose; but I do not wish to be limited in details of construction, which may be variously modified without departing from the spirit of my invention.

The castings which I have shown and described, which are disposed within the yoke, might be modified in form and detail to fit any draw-bar yoke desired to be used.

I claim—

1. In a draft-gear, the combination of the center sills of a car, draft-plates secured to said sills, a draw-bar and yoke movable in said draft-plates, follower-bars extending through said yoke and draft-plates, and cushioning-springs disposed between said follower-bars outside of the draft-plates, substantially as described.

2. In a draft-gear, the combination of the underframing of a car, draft-plates secured to said underframe, a draw-bar yoke movable in said draft-plates, with cushioning-springs disposed within said yoke, follower-bars passing through the aforesaid yoke and draft-plates, and cushioning-springs for said follower-bars, substantially as described.

3. In a draft-gear, the combination of the sills forming part of the underframing of a car, a draft plate or plates secured to said sills, a draw-bar and yoke movable in said draft-plates, follower-bars extending through said yoke and through openings in the draft-plates, and cushioning-springs between said follower-bars upon the outside and inside of said draft-plates, substantially as described.

4. In a draft-gear, the combination of the underframing of a car, draft-plates secured to said underframe, a draw-bar yoke movable in said draft-plates, slotted castings disposed within said yoke, cushioning-springs disposed between said castings, forward and rear follower-bars passing through said draft-plates and slotted castings, and cushioning-springs disposed between the outer ends of said forward and rear follower-bars, substantially as described.

5. In a draft-gear, the combination of the draw-bar yoke, slotted castings disposed within said yoke, cushioning-springs between said castings, forward and rear follower-bars passing through the slots in said castings, slotted tubes fitting over the outer ends of the follower-bars, and cushioning-springs supported by said tubes between said follower-bars, substantially as described.

6. The combination with the center sills and body-bolster of a car, of draft-plates fastened against the sills and having parts abutting against the body-bolster, angle-irons secured to said draft-plates and sills, a draw-bar and yoke movable in the draft-plates, follower-bars extending through openings in the draft-plates and yoke, and cushioning-springs for said follower-bars at the outer sides of the draft-plates.

7. In a draft-gear, the combination of draft-plates having elongated forward and rear openings, a draw-bar having a yoke secured to the rear end thereof, washers disposed within said yoke and supporting an outside and inside cushioning-spring therein, forward and rear follower-bars extending through openings in the washers disposed within said yoke and through openings in the draft-plates, and cushioning-springs for said follower-bars at the outer sides of the draft-plates, substantially as described and for the purpose set forth.

8. In a draft-gear, the combination with longitudinally-extending sills forming part of the underframing of a car, draft-plates secured to said sills, a draw-bar movable in the draft-plates, castings or washers abutting against each end of the yoke of the draw-bar, compressible springs disposed between said washers, follower-bars extending through openings in the castings, draft-plates and angle-irons, and cushioning-springs for the follower-bars outside of the draft-plates, substantially as and for the purpose set forth.

9. In combination with the center sills and body-bolster of a car, draft-plates secured to said sills, recesses in the draft-plates fitting over the top of said body-bolster, a draw-bar and yoke movable in said draft-plates, follower-bars extending through openings in the draft-plates and yoke, and cushioning-springs for said follower-bars, at the outside of the draft-plates, substantially as described.

10. The combination of the center sills and body-bolster of a car, with a draft plate or plates secured to said sills, recesses or notches in said draft-plates, said recesses adapted to receive and fit around the body-bolster, a draw-bar and yoke movable in said draft plates, follower-bars extending through openings in the draft-plates, and cushioning-springs disposed between said follower-bars upon the outside and inside of the draft-plates, substantially as described.

11. The combination of the center sills and body-bolster of a car, with a draft plate or plates having recesses therein adapted to receive and fit around said bolster, angle-plates secured to the center sills and forming an end bearing for said draft-plates, a draw-bar and yoke movable in said draft-plates, follower bars extending through openings in the draft-plates, and cushioning-springs between said follower-bars upon the outside and inside of the draft-plates, substantially as described.

12. The combination of the center sills and body-bolster of a car, draft-plates secured to the entire length of said sills, recesses in said draft-plates fitting over said body-bolster, coincident openings through the center sills and draft-plates, follower-bars extending through said openings, and cushioning-springs for said follower-bars outside of the center sills, substantially as described.

In testimony whereof I have signed this specification in the presence of two subscribing witnesses.

HERMAN C. PRIEBE.

Witnesses:
JENNIE L. FISKE,
I. H. KING.